C. L. BARKER.
SHAFT STEADYING DEVICE.
APPLICATION FILED JUNE 18, 1918.
1,282,364. Patented Oct. 22, 1918.
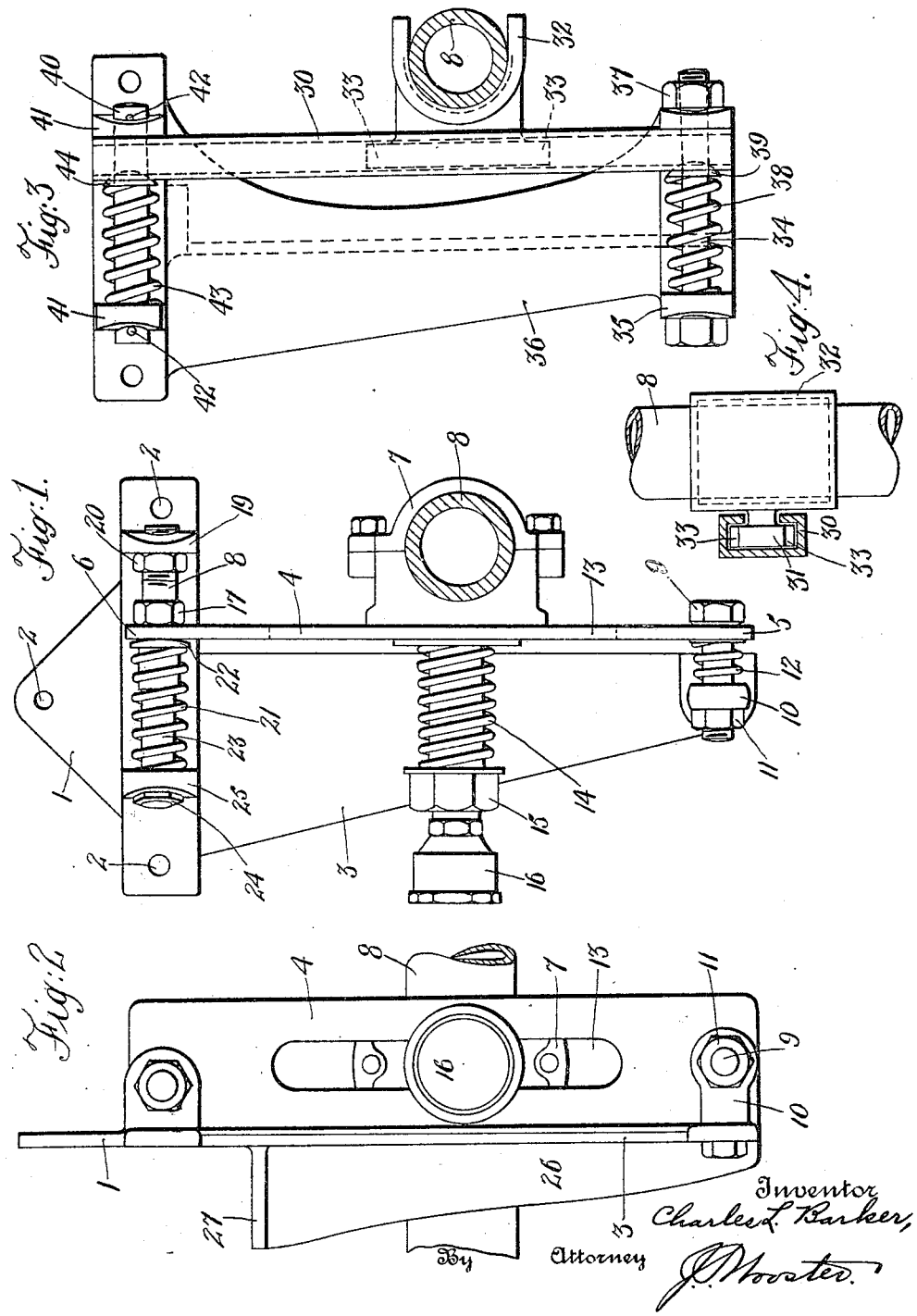
Inventor
Charles L. Barker,
By
Attorney

UNITED STATES PATENT OFFICE.

CHARLES L. BARKER, OF NORWALK, CONNECTICUT.

SHAFT-STEADYING DEVICE.

1,282,364. Specification of Letters Patent. Patented Oct. 22, 1918.

Application filed June 18, 1918. Serial No. 240,692.

*To all whom it may concern:*

Be it known that I, CHARLES L. BARKER, a citizen of the United States, and a resident of Norwalk, in the county of Fairfield and State of Connecticut, have invented certain new and useful Improvements in Shaft-Steadying Devices, of which the following is a specification.

This invention relates to a shaft steadying device, and has particular reference to improvements in the mechanism shown in my Patent 1,124,256 issued January 12, 1915.

The object of the present invention is to provide a steadying device for the shaft of an automobile or other shaft containing a universal joint and subject to oscillatory movement in a plane, this plane in the case of an automobile being vertical, which can be built in the factory in a unit and installed bodily on the automobile by the usual mechanics obtainable in shops and garages. In my patent, the device is so constructed that it has to be assembled on the automobile, requiring considerable mechanical work of fitting and adjusting which is avoided by the present invention.

A further object of the invention is to mount the shaft on a member having a floating movement at the bottom as well as at the top, which I have found to give greater freedom of action in practice, as compared with the structure shown in my patent wherein the shaft supporting member oscillates around a center at its lower end.

Further objects of the invention reside in the simplification of the structure, especially for light powered cars, and the detail arrangement and location of parts, all of which will be more fully understood from the description of the accompanying drawings in which, Figure 1 is an elevation of the preferred form, Fig. 2 is a side view, Fig. 3 is a view similar to Fig. 1, of a modification, and Fig. 4 is a partial plan view of Fig. 3.

1 represents a base having holes 2, 2, 2, for attachment to one of the cross members of the chassis, and having a depending plate supporting arm 3. 4 represents a depending bearing supporting member which is mounted to float at its lower end 5, and preferably also at its upper end 6, and carrying the bearing 7 to receive the shaft 8 mounted in such manner as to reciprocate thereon, and also to oscillate slightly. The floating member 4 is carried at its lower end on the support 3 by means of a bolt 9 threaded into an eye 10 and held by a lock nut 11, to permit an adjustment of the effective length of the bolt 9. A spring 12 is interposed between the lower end 5 of the supporting member 4 and the eye 10, resiliently holding the support 4 at its lower end 5 against the head of bolt 9. The bearing 7 can reciprocate in a slot 13 in the supporting member 4, and can also oscillate slightly on the flat surface of member 4, being resiliently held against the member 4 by spring 14 and adjustable nut 15, 16 being a grease cup. The upper end 6 of support 4 also has a floating movement, one side bearing against the head 17 of a stud 18 threaded into a lug 19 on the base 1 and having a lock nut 20, while the other side is pressed against the head 17 by means of a spring 21 bearing on a button 22, the other end of the spring being centered on a stud 23 fastened by nut 24 in lock 25. The heads of bolts 9 and 18 and button 22 are rounded as shown so as to facilitate a floating movement at either end of depending support 4. The depending portion 3 of the base is provided with a strengthening web 26 and a flange 27, for coöperating with the end side of the cross member to which the device will be fastened.

In operation, the unit will first be placed on the shaft and then marks made on the truck cross member where the holes are to be drilled, and wedges may be placed between the base 1 and the vertical side of the cross member of the chassis so as to bring the plane of the supporting member 4 normal to the shaft 8. In an automobile chassis, the shaft 8 usually dips slightly between the universal joint on the frame and the driving axle, although it will be seen that the permissible oscillation of the bearing 7 in slot 13 will take care of considerable angularity. The springs 12, 14 and 21 will ordinarily be adjusted at the proper tension by the factory, it being noted that this tension does not have to be very great since it does not require much force to oppose the tendency of a shaft to whip, it being found that the best location is about ⅓ to ⅔ the length of the shaft from the forward universal joint, the bearing fitting the shaft with a very loose fit.

In Fig. 3, a simplified unit is shown adapted for light powered trucks wherein the supporting member 30 is formed with a channel to receive the headed support 31 of bearing 32, this support being beveled at its ends as shown as at 33 so as to permit it to oscillate, as well as reciprocate. The bearing 32 is open on one side, and a similar bearing open on one side can also be used in Fig. 1, since I have found that a shaft does not whip if confined only at one side, and the bearing need not even be 180° as shown in Fig. 4. Such a bearing is simpler to construct and install and will suffice in many cases. The member 30 is mounted at its lower end on a bolt 34 carried by lug 35 on depending base member 36, the position of the lower end of member 30 being adjusted by nut 37, a spring 38 similar to spring 12 bearing against the lower end of member 30 through a button 39 sliding on the bolt 34. At the upper end, a bolt 40 is pinned between lugs 41 by pins 42, and a spring 43 presses against button 44 similarly to spring 38 against button 39 to resiliently hold the upper end of member 30, since it is found that the necessary resilience at the upper end can be fixed once for all in the shop, although an adjustment of the resilient pressure at the upper end can be provided similar to that at the lower end, if desired.

From the foregoing, it will be seen that this invention provides a shaft steadying unit which can be built in the factory in standard sizes and sold ready for installation without requiring expensive fitting and measuring of parts. Also, this invention is cheaper to construct, and by reason of the provision of the floating bearing support at the lower end gives better results in service owing to reduced wear on the parts, while by permitting the bearing support to float at both ends, the lateral strains of the shaft will be taken up according to their direction with the least resistance.

Various modifications and changes may be made in the details of construction without departing from the scope of the appended claims.

What is claimed, is:

1. Means for preventing whipping of a shaft comprising a base, a depending arm pivoted to said base at its upper end and yieldingly connected thereto at its lower end, and a sliding and oscillating bearing on said arm.

2. Means for preventing whipping of a shaft comprising a base, a depending arm yieldingly connected thereto at its ends, and a sliding and oscillating bearing on said arm.

3. Means for preventing whipping of a shaft comprising a base, a depending arm pivoted to said base at its upper end and mounted at its lower end to yieldingly move laterally, and a bearing on said arm mounted to slide and oscillate, and to yieldingly move laterally in a direction opposite to the yielding lateral movement of the lower end of said arm.

4. A base adapted for rigid attachment to a cross piece and having a projecting portion, an arm movably mounted at its ends on said projecting portion to yield laterally at one end, and a bearing mounted to slide and oscillate on said arm.

5. A base adapted for rigid attachment to a cross piece and having a projecting portion, an arm mounted at its ends to yieldingly move bodily relatively to said projecting portion, and a bearing mounted to slide and oscillate on said arm.

6. A base adapted for rigid attachment to a cross piece, a bodily movable yieldingly floating arm carried by said base, and a bearing mounted to slide and oscillate on said arm.

7. A base adapted for rigid attachment to a cross piece and having a projecting portion, adjustable stops carried thereon, an arm extending between said stops, springs yieldingly holding said arm against said stops, and a bearing mounted to slide and oscillate on said arm.

8. A base adapted for rigid attachment to a cross piece and having a projecting portion, adjustable stops carried thereon, an arm extending between said stops, springs yieldingly holding said arm against said stops, and a bearing mounted to slide and oscillate on said arm, and to yieldingly move laterally of said arm.

9. A base adapted for rigid attachment to a cross piece and having a projecting portion, an adjustable stop at the outer end, an arm bearing against said stop, a spring bearing against the arm to yieldingly hold it against said stop, means movably connecting the other end of the arm to the base, and a bearing intermediately mounted to slide and oscillate on said arm.

10. In a device to prevent whipping of a shaft comprising a movable arm mounted to yield laterally at one end, an open bearing mounted to slide and oscillate on said arm.

11. In a device to prevent whipping of a shaft comprising a movable arm mounted to yield laterally at one end, an open bearing mounted between the yielding lower end of the arm and its upper end to slide and oscillate on said arm.

12. In a device to prevent whipping of a shaft, a supporting arm mounted to yield at both ends, and a bearing mounted thereon having an open side opposite said support.

13. In a device to prevent whipping of a shaft, a support floating at both ends slidably carrying a bearing adapted to oscillate.

Signed at Norwalk, in the county of Fairfield, and State of Connecticut this 14th day of June, A. D. 1918.

CHARLES L. BARKER.

Witnesses:
LESTER HYATT,
HENRY P. PRICE.

Copies of this patent may be obtained for five cents each, by addressing the "Commissioner of Patents, Washington, D. C."